('12) United States Patent
Itou et al.

(10) Patent No.: US 10,508,865 B2
(45) Date of Patent: Dec. 17, 2019

(54) HEAT EXCHANGER

(71) Applicant: DENSO CORPORATION, Kariya, Aichi-pref. (JP)

(72) Inventors: Shunji Itou, Kariya (JP); Masaya Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 7 days.

(21) Appl. No.: 16/060,040

(22) PCT Filed: Nov. 21, 2016

(86) PCT No.: PCT/JP2016/084434
§ 371 (c)(1),
(2) Date: Jun. 7, 2018

(87) PCT Pub. No.: WO2017/098902
PCT Pub. Date: Jun. 15, 2017

(65) Prior Publication Data
US 2018/0363987 A1    Dec. 20, 2018

(30) Foreign Application Priority Data
Dec. 10, 2015 (JP) ................. 2015-240800

(51) Int. Cl.
*F28F 9/02*        (2006.01)
*F28D 7/00*        (2006.01)
(Continued)

(52) U.S. Cl.
CPC ......... *F28D 7/0083* (2013.01); *F28D 1/0461* (2013.01); *F28D 1/05375* (2013.01);
(Continued)

(58) Field of Classification Search
CPC .. F28D 7/0083; F28D 1/0461; F28D 1/05375; F28D 20/0039; F28D 1/0213; F28D 2020/0069; F28F 9/0202; F28F 9/0226; F28F 2009/0287; F28F 2265/26; F28F 2270/02; F28F 1/00; F28F 27/00; B60K 6/22
USPC ........................................... 165/174
See application file for complete search history.

(56) References Cited

U.S. PATENT DOCUMENTS

2002/0040776 A1    4/2002    Kokubunji et al.
2005/0051315 A1    3/2005    Ozaki et al.
(Continued)

FOREIGN PATENT DOCUMENTS

CN    1860341 A     11/2006
JP    H04122981 U   11/1992
(Continued)

*Primary Examiner* — Davis D Hwu
(74) *Attorney, Agent, or Firm* — Harness, Dickey & Pierce, P.L.C.

(57) ABSTRACT

A heat exchanger includes a core portion including a plurality of tubes, and header tanks located on opposite ends in the longitudinal direction of the plurality of tubes and communicate with the plurality of tubes. A first fluid flows through a first tank chamber and a first tube group of the plurality of tubes. A second fluid different in temperature range from the first fluid flows through a second tank chamber and a second tube group of the plurality of tubes connected to the second tank chamber. The heat exchanger includes a flow rate limiting portion. The flow rate limiting portion is configured to reduce a flow rate of the first fluid or the second fluid supplied to at least first one tube of the plurality of tubes from a boundary portion provided by the partition wall.

6 Claims, 13 Drawing Sheets

(51) Int. Cl.
    *F28D 1/04*     (2006.01)
    *F28D 1/053*    (2006.01)
    *B60K 6/22*     (2007.10)
(52) U.S. Cl.
    CPC .......... *F28F 9/0202* (2013.01); *F28F 9/0226*
              (2013.01); *B60K 6/22* (2013.01); *F28F*
              *2009/0287* (2013.01); *F28F 2265/26*
                (2013.01); *F28F 2270/02* (2013.01)

(56) References Cited

U.S. PATENT DOCUMENTS

| | | |
|---|---|---|
| 2007/0012425 A1 | 1/2007 | Sugito et al. |
| 2007/0114013 A1 | 5/2007 | Augenstein et al. |
| 2011/0168372 A1 | 7/2011 | Takahashi et al. |
| 2011/0220318 A1 | 9/2011 | Kopchick et al. |
| 2012/0247742 A1 | 10/2012 | Mizuno et al. |
| 2016/0252281 A1 | 9/2016 | Abei et al. |

FOREIGN PATENT DOCUMENTS

| | | |
|---|---|---|
| JP | 2000055573 A | 2/2000 |
| JP | 2002115991 A | 4/2002 |
| JP | 2004219044 A | 8/2004 |
| JP | 2004278867 A | 10/2004 |
| JP | 2005274110 A | 10/2005 |
| JP | 2006284107 A | 10/2006 |
| JP | 2011099631 A | 5/2011 |
| JP | 2012215366 A | 11/2012 |
| WO | WO-2010133491 A1 | 11/2010 |
| WO | WO-2015045344 A1 | 4/2015 |

HEAT EXCHANGER

CROSS REFERENCE TO RELATED APPLICATIONS

This application is a U.S. National Phase Application under 35 U.S.C. 371 of International Application No. PCT/JP2016/084434 filed on Nov. 21, 2016 and published in Japanese as WO 2017/098902 A1 on Jun. 15, 2017. This application is based on and claims the benefit of priority from Japanese Patent Application No. 2015-240800 filed on Dec. 10, 2015. The entire disclosures of all of the above applications are incorporated herein by reference.

TECHNICAL FIELD

The present disclosure relates to a heat exchanger.

BACKGROUND ART

In recent years, hybrid vehicles, fuel cell vehicles, downsizing vehicles with supercharger or the like become widespread, and there is an increasing demand for cooling multiple medium as social needs. To effectively cool multiple medium in a small space, a so-called complex heat exchanger (also referred to as multifunction radiator) configured to work on multiple heat exchanging systems is proposed (see Patent Document 1, for example). The heat exchanger disclosed in Patent Document 1 includes tubes for a first heat exchanging system and tubes for a second heat exchanging system, and inside spaces of header tanks are partitioned by screen so as to correspond to each system.

PRIOR ART DOCUMENT

Patent Document

Patent Document 1: JP 2012-215366 A

SUMMARY OF THE INVENTION

In the complex heat exchanger, fluids with different temperature flow in heat exchanging systems, generally. Since the temperature of the heat exchanger may change largely in a boundary portion between adjacent heat exchanging systems due to the temperature difference of the fluids, thermal expansion difference becomes large, and accordingly the thermal expansion difference cannot be absorbed and the tubes may be deformed. In the future, it is assumed that the complex heat exchanger is used in a severe condition in which the temperature difference between the heat exchanging systems is large, and accordingly it is preferred that occurrence of deformation around the boundary portion between the adjacent heat exchanging systems due to thermal expansion can be limited.

Further, as in the conventional complex heat exchangers, it is required that airtightness of the boundary portion between the adjacent heat exchanging systems is secured.

In consideration of the above-described points, it is an objective of the present disclosure to provide a heat exchanger that includes multiple chambers in a header tank, and multiple heat exchanging systems, the heat exchanger being capable of limiting occurrence of deformation around a boundary portion between the heat exchanging systems due to thermal expansion difference, and the heat exchanger being capable of securing airtightness of the boundary portion.

A heat exchanger according to an aspect of the present disclosure includes a core portion including a plurality of tubes in which a fluid flows, and a pair of header tanks that are located on opposite ends in the longitudinal direction of the plurality of tubes and communicate with the plurality of tubes. The header tank includes a first tank chamber and a second tank chamber, which are defined by a core plate joined to the plurality of tubes, a tank body, and a partition wall joined to the tank body. A first fluid flows through the first tank chamber of the header tank and a first tube group of the plurality of tubes connected to the first tank chamber. A second fluid different in temperature range from the first fluid flows through the second tank chamber and a second tube group of the plurality of tubes connected to the second tank chamber. The heat exchanger includes a flow rate limiting portion provided in at least one of the first tank chamber or the second tank chamber. The flow rate limiting portion is configured to reduce a flow rate of the first fluid or the second fluid supplied to at least first one tube of the plurality of tubes from a boundary portion provided by the partition wall.

According to this configuration, the flow rate supplied to tubes close to the boundary portion between the first tank chamber and the second tank chamber is reduced. Accordingly, the temperature difference between the inside and the outside of the tubes can be reduced, and occurrence of deformation due to thermal expansion difference can be limited.

According to the present disclosure, in the configuration which includes multiple chambers in the header tank and multiple heat exchanging systems, occurrence of deformation due to thermal expansion difference around the boundary portion between the heat exchanging systems can be limited. Moreover, airtightness of the boundary portion can be secured.

EMBODIMENTS FOR EXPLOITATION OF THE INVENTION

Figure 1:
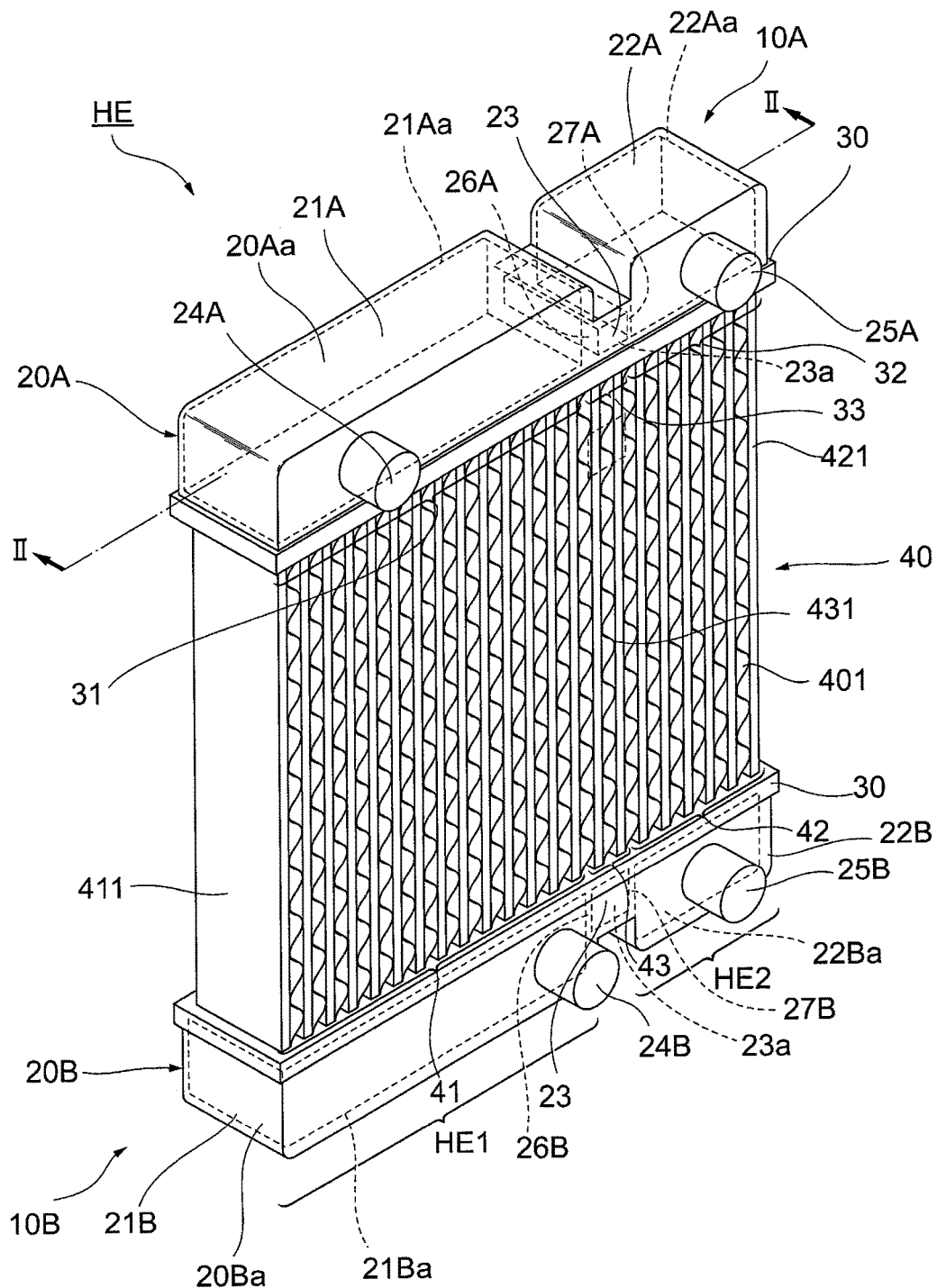
FIG. 1 is a perspective diagram illustrating an exterior appearance of a heat exchanger according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereinafter, embodiments of the present disclosure will be described with respect to the drawings. In the drawings, the same reference numerals are assigned to the same or similar parts for simplifying descriptions, and redundant descriptions will be omitted.

First Embodiment

A first embodiment will be described with reference to FIGS. 1 to 4. First, a configuration of a heat exchanger HE according to the first embodiment will be described. The heat exchanger HE is used as a radiator for a hybrid vehicle. As shown in FIG. 1, the heat exchanger HE functions as a first heat exchanger HE1 and a second heat exchanger HE 2. The first heat exchanger HE1 is configured as a radiator for an engine coolant (first fluid). The second heat exchanger HE2 is configured as a radiator for a coolant for an electric power system (second fluid).

The heat exchanger HE includes, as parts, a header tank 10A, a header tank 10B, and a heat exchanging portion (core portion) 40. The heat exchanging portion 40 is between the header tank 10A and the header tank 10B.

The header tank 10A includes a header tank member 20A and a core plate 30. The header tank member 20A has a box shape whose one face is opened. The core plate 30 is provided on the opened face. The header tank member 20A and the core plate 30 are joined with each other by plastically deforming claws of the core plate 30.

The header tank member 20A is a resin product produced by filling a mold cavity with resin. The resin includes polyamide and glass fiber as a reinforcing material. It is preferred that the core plate 30 is made of aluminum having high thermal conductivity to secure high thermal conductivity.

Ends of multiple first tubes 411, second tubes 421, and third tubes 431 on a longitudinal direction thereof are bonded to the core plate 30 by brazing. Cooling fins 401 are provided between the first tubes 411, between the second tubes 421, between the third tubes 431, between the first tube 411 and the third tube 431, and between the second tube 421 and the third tube 431. The first tubes 411 may be stacked with each other. The second tubes 421 may be stacked with each other. The third tubes 431 may be stacked with each other. The first tubes 411, the second tubes 421, and the third tubes 431 may be stacked with each other. The first tubes 411 may be a first tube group 411. The second tubes 421 may be a second tube group.

Figure 2:
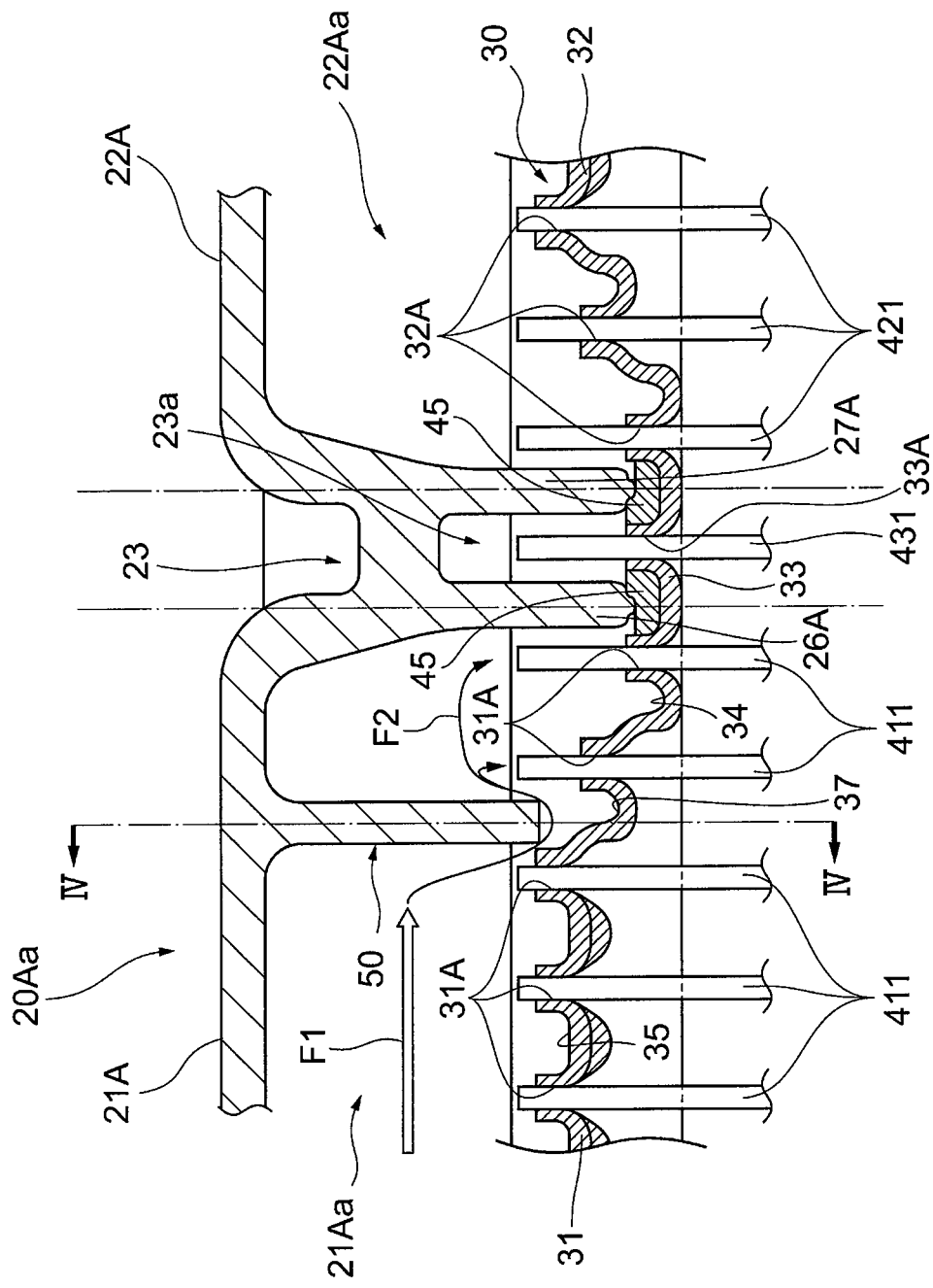
FIG. 2 is an enlarged diagram illustrating a part of a cross-section around a third region taken along II-II line of FIG. 1.
Figure 3:
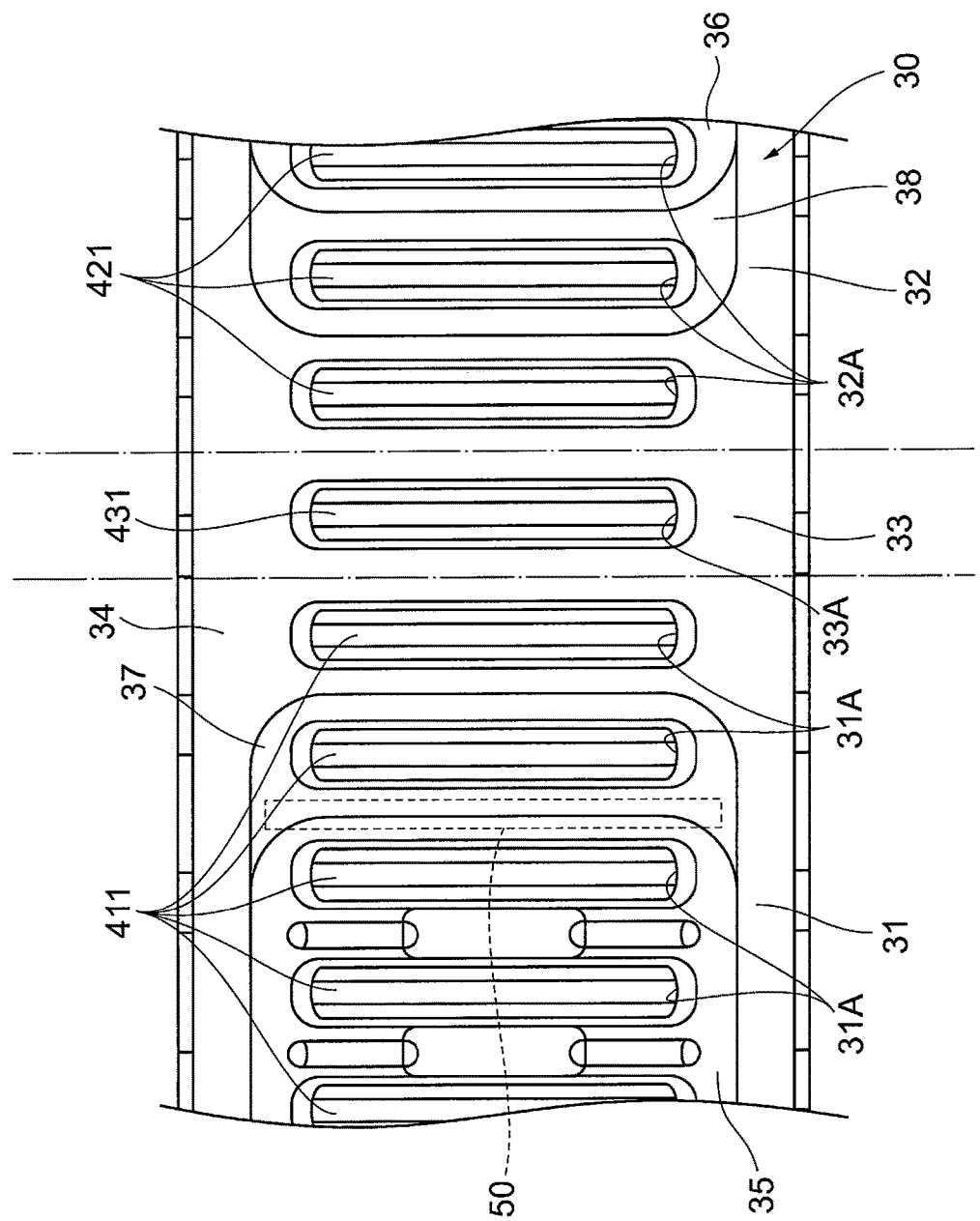
FIG. 3 is a plan view illustrating a header tank shown in FIG. 2 viewed from a core plate.

The core plate 30 includes a first plate portion 31, a second plate portion 32, and a third plate portion 33. The third plate portion 33 is between the first plate portion 31 and the second plate portion 32. The core plate 30 is a plate member in which the first plate portion 31, the second plate portion 32, and the third plate portion 33 are integrated with each other. The core plate 30 includes a predetermined openings 31A, 32A, 33A through which the first tubes 411, the second tubes 421, and the third tubes 431 extend and are fixed, respectively. The first tubes 411 are connected to the first plate portion 31. The second tubes 421 are connected to the second plate portion 32. The third tubes 431 are connected to the third plate portion 33. In FIGS. 2 and 3, a boundary between the first plate portion 31 and the third plate portion 33, and a boundary between the second plate portion 32 and the third plate portion 33 are indicated with dot-and-dash lines.

As shown in FIGS. 2, 3, the core plate 30 includes the third plate portion 33, a sealing surface 34 including a part of the first plate portion 31 and the second plate portion 32 close to the third plate portion 33, and tube connection surfaces 35, 36 including most of the openings 31A, 33A. The tube connection surfaces 35, 36 are recessed from the sealing surface 34 toward an inside of the header tank 10A. The tube connection surfaces 35, 36 are located inward of the sealing surface 34 in the header tank 10A, and the tube connection surfaces 35, 36 face the same direction as the sealing surface 34. Connection surfaces 37, 38 (connection portions), through which the sealing surface 34 is connected to the tube connection surfaces 35, 36, are provided between the sealing surface 34 and the tube connection surfaces 35, 36. The first plate portion 31 of the sealing surface 34 includes at least one opening 31A to which at least one first tube 411 is connected. In the present embodiment, the connection surface 37 includes one opening 31A to which one first tube 411 is connected. Likewise, the second plate portion 32 of the sealing surface 34 includes at least one opening 32A to which at least one second tube 421 is connected. The connection surface 38 includes one opening 32A to which one second tube 421 is connected.

The first tubes 411, the second tubes 421, the third tubes 431, and the cooling fins 401 constitute the heat exchanging portion 40 (core portion). It is preferred for high thermal conductivity that the first tubes 411, the second tubes 421, and the third tubes 431 are made of aluminum which has high thermal conductivity, for example.

The heat exchanging portion 40 includes a first heat exchanging portion 41, a second heat exchanging portion 42, and a thermal deformation buffer portion 43. The first tubes 411 and the cooling fins 401 therebetween constitute the first heat exchanging portion 41. The second tubes 421 and the cooling fins 401 therebetween constitute the second heat exchanging portion 42. The third tubes 431 and the cooling fins 401 therebetween constitute thermal deformation buffer portion 43.

The header tank member 20A includes a member body 20Aa (tank body) and a sealing member 45. As shown in FIGS. 1, 2, the member body 20Aa includes a first region 21A, a second region 22A, and a third region 23. The third region 23 is between the first region 21A and the second region 22A. The first region 21A, the second region 22A, and the third region 23 are parts of the member body 20Aa each of which has a box shape opening to the same direction. The first region 21A, the second region 22A, and the third region 23 are partitioned by partition walls 26A, 27A integrated with an inner wall of the member body 20Aa.

The first region 21A is closed by the first plate portion 31, and a first tank chamber 21Aa in which the engine coolant is temporarily stored is defined in the first region 21A. That is, the first tank chamber 21Aa is a space defined by the first region 21A of the member body 20Aa, the first plate portion 31 of the core plate 30, and the partition wall 26A. The first region 21A includes an inflow port 24A on an end farther from the third region 23. The engine coolant flowing into the first tank chamber 21Aa through the inflow port 24A is temporarily stored in the first tank chamber 21Aa. The engine coolant temporarily stored in the first tank chamber 21Aa is distributed and flows into the first tubes 411.

The second region 22A is closed by the second plate portion 32, and a second tank chamber 22Aa in which the coolant for electric power system is temporarily stored is defined in the second region 22A. That is, the second tank chamber 22Aa is a space defined by the second region 22A of the member body 20Aa, the second plate portion 32 of the core plate 30, and the partition wall 27A. The second region 22A includes an inflow port 25A. The coolant for electric power system flowing into the second tank chamber 22Aa through the inflow port 25A is temporarily stored in the second tank chamber 22Aa. The coolant for electric power system temporarily stored in the second tank chamber 22Aa is distributed and flows into the second tubes 421.

The third region 23 is closed by the third plate portion 33, and a third tank chamber 23a in which the coolant is not stored is defined in the third region 23. That is, the third tank chamber 23a is a space defined by the third region 23 of the member body 20Aa, the third plate portion 33 of the core plate 30, the partition wall 26A, and the partition wall 27A. The third tube 431 connected to the third plate portion 33 is a dummy tube in which the coolant does not flow. The first tank chamber 21Aa, the second tank chamber 22Aa, and the third tank chamber 23a may be aligned in a stacking direction of the tubes through the partition wall 26A.

As described above, temperature of the coolant flowing through the first tubes 411 of the first heat exchanging portion 41 is different from temperature of the coolant flowing through the second tubes 421 of the second heat exchanging portion 42. Accordingly, when the first tubes 411 and the second tubes 421 are adjacent to each other, the tubes may be deformed due to the temperature difference. To avoid the thermal deformation of the tubes, the third tubes 431 is provided as thermal deformation buffer portion 43 in which the coolant does not flow.

The sealing members 45 are interposed between the member body 20Aa and the core plate 30 and attached to the lateral walls of the member body 20Aa and ends of the partition wall 26A, 27A, and accordingly the sealing member 45 defines the first tank chamber 21Aa, the second tank chamber 22Aa, and the third tank chamber 23a. The sealing member 45 is interposed between and compressed by the core plate 30 and the member body 20Aa, and accordingly the sealing member 45 limits water from leaking from the first tank chamber 21Aa and the second tank chamber 22Aa.

As described above, the first tank chamber 21Aa is separated by the partition wall 26A from the second tank chamber 22Aa and the third tank chamber 23a. The second tank chamber 22Aa is separated by the partition wall 27A from the first tank chamber 21Aa and the third tank chamber 23a. In FIGS. 2, 3, the boundary between the first region 21Aa and the third tank chamber 23a, and the boundary between the second tank chamber 22Aa and the third tank chamber 23a are indicated by dot-and-dash lines. In the present embodiment, the partition walls 26A, 27A, and the third region 23 interposed therebetween are "boundary portions" between the first tank chamber 21Aa and the second tank chamber 22Aa.

As shown in FIG. 1, the header tank 10B includes a header tank member 20B, and the core plate 30. The header tank member 20B has a box shape whose one face is open. The core plate 30 is provided on the opened face. The header tank member 20B and the core plate 30 are joined with each other by plastically deforming claws of the core plate 30. Features of the header tank member 20B different from the header tank member 20A will be described.

Figure 4:
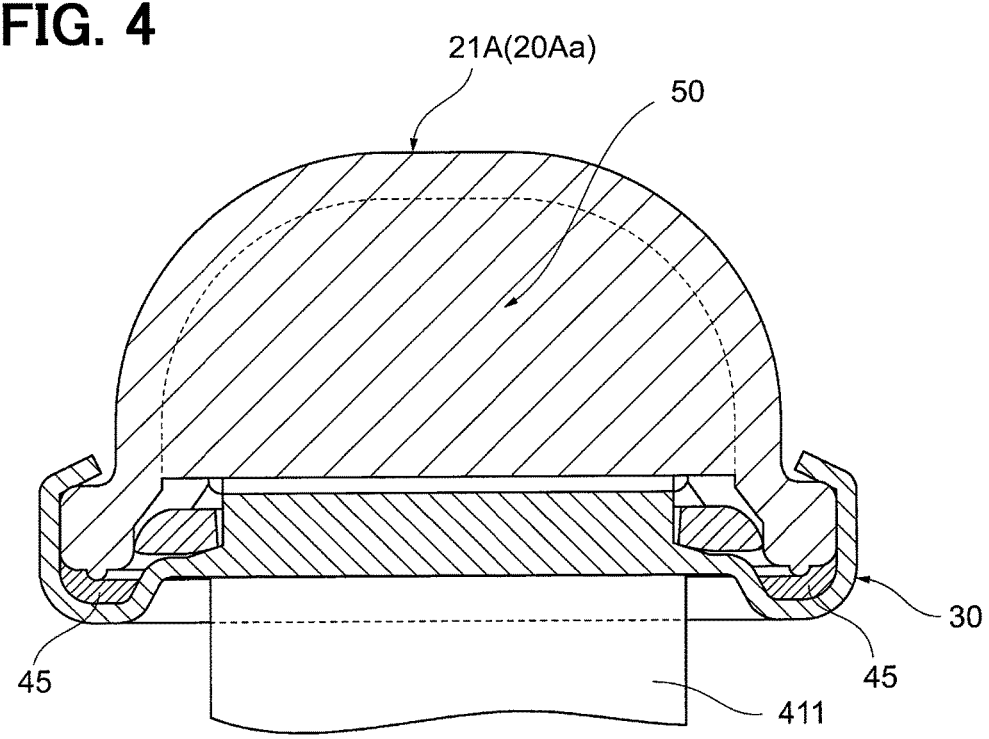
FIG. 4 is a cross-sectional diagram taken along IV-IV line of FIG. 2.

The header tank member 20B includes a member body 20Ba (tank body), and a sealing member (that is not shown and has the same structure of the sealing member 45 shown in FIG. 4). The member body 20Ba includes a first region 21B, a second region 22B, and the third region 23. The third region 23 is between the first region 21B and the second region 22B. The first region 21B, the second region 22B, and the third region 23 are parts of the member body 20Ba each of which has a box shape opening to the same direction. The first region 21B, the second region 22B, and the third region 23 are partitioned by a partition walls 26B, 27B integrated with the inner wall of the member body 20Ba.

The first region 21B is closed by the first plate portion 31, and a first tank chamber 21Ba in which the engine coolant is temporarily stored is defined in the first region 21B. That is, the first tank chamber 21Ba is a space defined by the first region 21A of the member body 20Ba, the first plate portion 31 of the core plate 30, and the partition wall 26B. The first region 21B includes an outflow port 24B on an end closer to the third region 23. The engine coolant flows into the first tank chamber 21Ba from the first tubes 411. The engine coolant flowing into the first tank chamber 21Ba from the first tubes 411 are temporarily stored in the first tank chamber 21Ba. The engine coolant temporarily stored in the first tank chamber 21Ba flows out through the outflow port 24B. The engine coolant flowing out through the outflow port 24B flows to the engine (not shown) to cool the engine, and returns to the inflow port 24A.

The second region 22B is closed by the second plate portion 32, and a second tank chamber 22Ba in which the coolant for electric power system is temporarily stored is defined in the second region 22B. That is, the second tank chamber 22Ba is a space defined by the second region 22B of the member body 20Ba, the second plate portion 32 of the core plate 30, and the partition wall 27B. The second region 22B includes an outflow port 25B. The coolant for electric power system flows into the second tank chamber 22Ba through the second tubes 421. The coolant for electric power system flowing into the second tank chamber 22Ba from the second tubes 421 is temporarily stored in the second tank chamber 22Ba. The coolant for electric power system temporarily stored in the second tank chamber 22Ba flows out through the outflow port 25B. The coolant for electric power system circulates to cool an electric power system including an electric motor and inverter, and returns to the inflow port 25A.

As described above, the first heat exchanger HE1 is constituted by the first region 21A, the first plate portion 31 covering the first region 21A, the first heat exchanging portion including the first tubes 411 and the cooling fins 401, the first region 21B, and the first plate portion 31 covering the first region 21B. The second heat exchanger HE2 is constituted by the second region 22A, the second plate portion 32 covering the second region 22A, the second heat exchanging portion including the second tubes 421 and the cooling fins 401, the second region 22B, and the second plate portion 32 covering the second region 22B.

In the present embodiment, as shown in FIGS. 2 and 4, a screen 50 is provided in the first tank chamber 21Aa. The screen 50 is integrated with an inner peripheral surface of the member body 20Aa so as to face the partition wall 26A. In the present embodiment, the screen 50 is located, in the longitudinal direction of the header tank 10A (left-right direction of FIGS. 2, 3), between the first tube 411 connected to the connection surface 37 of the core plate 30 and the first tube 411 connected to a part of the tube connection surface 35 closest to the boundary portion.

The position of the screen 50 is acceptable as long as the screen 50 is closer to the tube connection surface 35 than the first tube 411 closest to the boundary portion in the first tubes 411 connected to the sealing surface 34. That is, the screen 50 may be on an opposite side from the boundary portion with respect to one or some first tubes 411 including the first tube 411 closest to the boundary portion.

As shown in FIG. 4, a gap is provided between the screen 50 and the core plate 30. Accordingly, the engine coolant flowing into the first tank chamber 21Aa through the inflow port 24A can be supplied to the first tubes 411 close to the boundary portions while the flow rate is limited.

Next, effects of the first embodiment will be described below. The fluid flowing through the first heat exchanger HE1 is the engine coolant, and the fluid flowing through the second heat exchanger HE2 is the coolant for the electric power system. A temperature range of the engine coolant is relatively higher than that of the coolant for the electric power system. If the high-temperature engine coolant flowing into the first tank chamber 21Aa through the inflow port 24A is directly supplied to the first tubes 411 adjacent to the boundary portion close to the second tank chamber 22Aa, a large amount of the high-temperature coolant may continuously flow through these first tubes 411. Since this first tubes 411 is adjacent to the second heat exchanger HE2 through which the coolant for the electric power system whose temperature is relatively low flows, the temperature around this first tube 411 becomes relatively low. According to this, temperature difference between the inside and the outside of this first tube 411 (i.e. between the first tube 411 and the second heat exchanger HE2 close to the first tube 411) is large, and difference in thermal expansion is large. This thermal expansion difference cannot be absorbed and distortion may occur in the tube.

In contrast, according to the present embodiment, the screen 50 is provided in the first tank chamber 21Aa that is an input side of the first heat exchanger HE1 through which the relatively high-temperature fluid flows. At least one first tube 411 (two tubes in the present embodiment as shown in FIG. 2, 3) is between the screen 50 and the boundary portion. The screen 50 is adjacent to a side of the at least one first tube 411 opposite from the boundary portion. The screen 50 is closer to the inflow port 24A of the first tank chamber 21Aa than the boundary portion. Accordingly, the high-temperature engine coolant flowing into the first tank chamber 21Aa through the inflow port 24A is supplied to the first tubes 411 connected to the tube connection surface 35 and flows toward the boundary portion as indicated by an arrow F1 of FIG. 2. Since the flow passage is narrowed by the screen 50, the engine coolant cannot flow easily through the screen 50 to the boundary portion, and accordingly the flow rate of the coolant toward the boundary portion through the screen 50 is limited as indicated by an arrow F2 of FIG. 2. Since the flow rate of the high-temperature fluid supplied to the first tube 411 adjacent to the boundary portion decreases, the temperature difference between the inside and the outside of the first tube 411 (i.e. the temperature difference between the first tube 411 and the second heat exchanger HE2 close to the first tube 411) is reduced, and accordingly deformation due to the difference in the thermal expansion may be limited. Since no processing of the core plate 30 is needed for limiting the deformation of the boundary portion, airtightness can be secured as in the conventional heat exchanger. Accordingly, the heat exchanger HE according to the first embodiment includes multiple chambers in the header tanks 10A, 10B, and occurrence of the deformation around the boundary portion between the first heat exchanger HE1 and the second heat exchanger HE2 due to the difference in the thermal expansion can be limited. Further, the airtightness can be secured.

That is, in the first embodiment, the screen 50 is provided in the first tank chamber 21Aa, and the screen 50 functions as a "flow rate limiting portion" that decreases the flow rate of the engine coolant supplied to at least first one of the first tubes 411 from the boundary portion provided by the partition wall 26A.

In the first embodiment, the screen 50 is located on the connection surface 37 of the core plate 30. According to this configuration, since the amount of the engine coolant supplied to the first tubes 411 connected to the sealing surface 34 and the connection surface 37 close to the boundary portion is decreased, the tubes that are likely to be deformed due to the thermal expansion difference can be protected. Since the engine coolant can be supplied to the tubes connected to the tube connection surface 35, in which the deformation due to the thermal expansion is unlikely to occur, irrespective of the screen 50, the performance of the first heat exchanger HE1 can be maintained.

In the present embodiment, the screen 50 is provided in the first tank chamber 21Aa that is an input side of the first heat exchanger HE1 through which relatively high-temperature fluid flows. However, the screen 50 may be provided in the second tank chamber 22Aa that is an input side of the second heat exchanger HE2 through which relatively low-temperature fluid flows. The screen 50 may be provided in both the first tank chamber 21Aa and the second tank chamber 22Aa. When the engine that is a cooling target of the first heat exchanger HE1 is stopped, and the electric power system such as the motor that is a cooling target of the second heat exchanger HE2 is actuated, the temperature of the coolant for the electric power system may be higher than that of the engine coolant. In this case also, the occurrence of the deformation in the second tubes 421 due to the thermal expansion can be limited by the same configuration as the present embodiment.

The screen 50 having the same configuration as the present embodiment may be provided in one or both of the first tank chamber 21Ba, which is an output side of the first heat exchanger HE1, and the second tank chamber 22Ba, which is an output side of the second heat exchanger HE2.

Modification Examples of First Embodiment

Modification examples will be described with reference to FIGS. 5 to 7.

Figure 5:
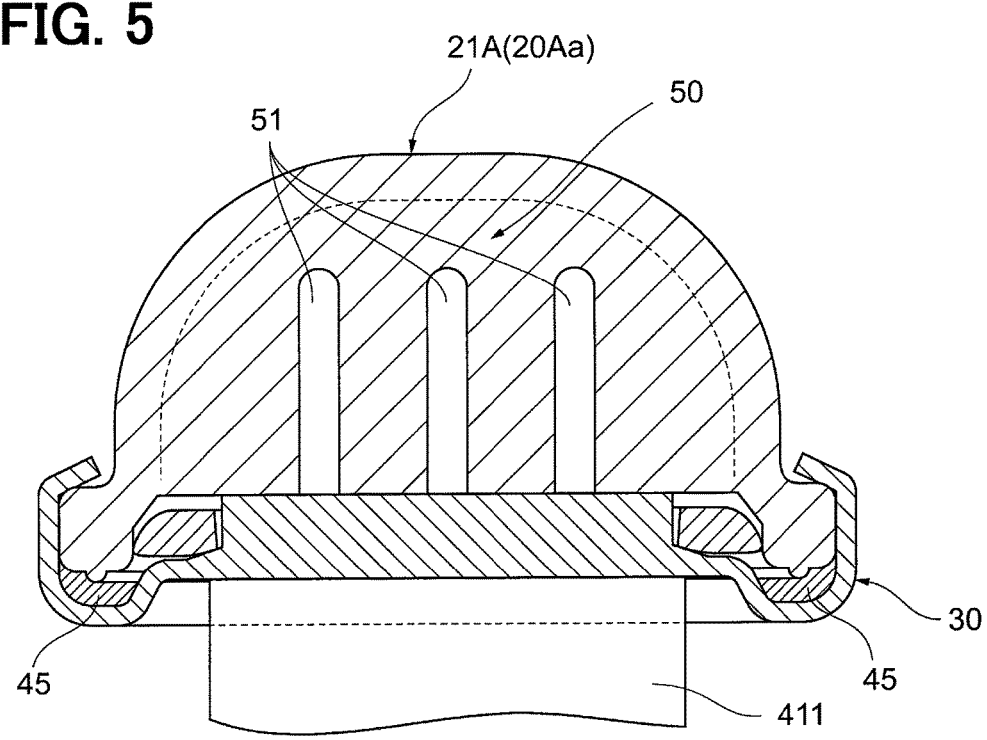
FIG. 5 is a cross-sectional diagram illustrating a modification of the first embodiment.

As shown in FIG. 5, the screen 50 may have a slit 51. The slit 51 extends from an end portion of the screen 50 in a direction from the core plate 30 toward an inner wall of the member body 20Aa of the header tank 10A. It is preferred that the direction in which the slit 51 extends is the same as the direction in which the member body 20Aa is attached to the core plate 30 (up-down direction of FIG. 5). When multiple slits 51 are provided (three, in FIG. 5), it is preferred that all slits extend in the same direction.

In this configuration, the end portion of the screen 50 may extend to contact with the core plate 30 such that a gap is not provided between the screen 50 and the core plate 30. The screen 50 may be provided such that a gap is provided between the screen 50 and the core plate 30 as in the first embodiment (see FIG. 4).

When the heat exchanger HE is provided such that an up-down direction of FIG. 5 corresponds to the vertical direction, i.e. when the header tank 10A is located above the header tank 10B, the flow passage defined by the screen 50 is narrowed in the width direction (left-right direction of FIG. 5), and the flow passage extends in the vertical direction. Since the flow passage extends to an upper part of the screen 50 in the vertical direction, the air remaining in an upper space around the boundary portion can be released toward the inflow port 24A through an upper part of the flow passage while the fluid flows to the boundary portion through a lower part of the flow passage. According to this, while the flow rate of the engine coolant supplied to the first tubes 411 closer to the boundary portion than the screen 50 can be decreased, the engine coolant can be effectively supplied to the first tubes 411 closer to the boundary portion than the screen 50.

Figure 6:
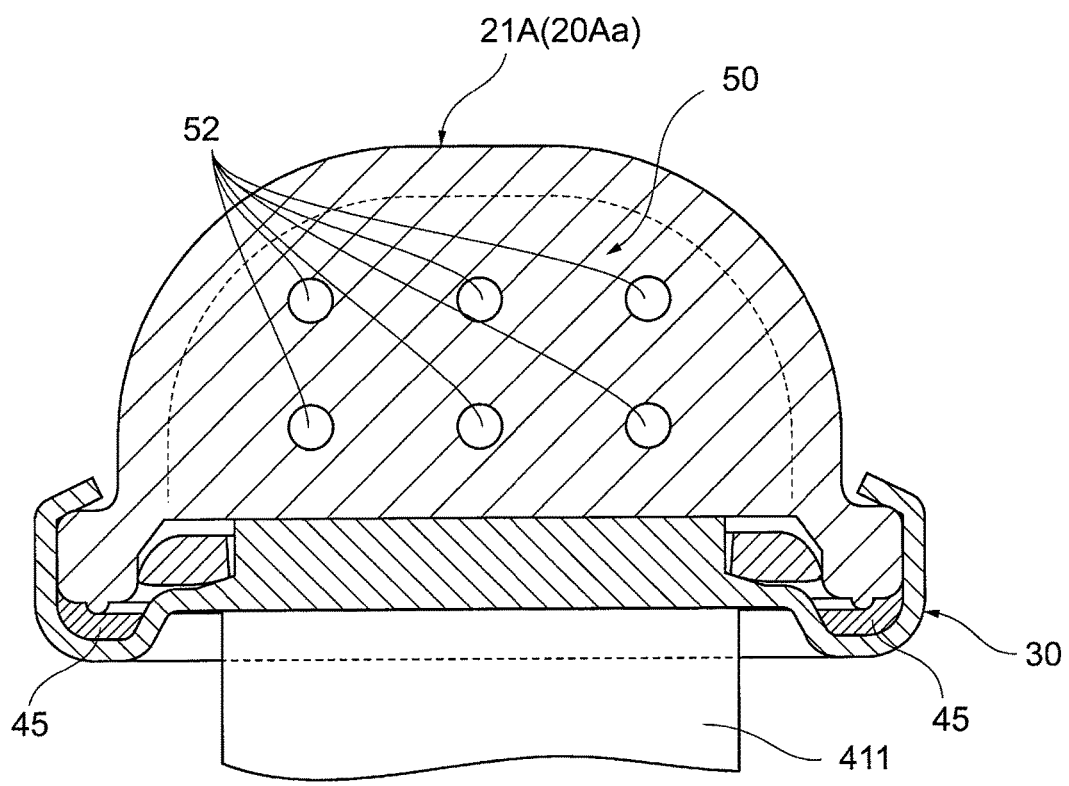
FIG. 6 is a cross-sectional diagram illustrating a modification of the first embodiment.

The screen 50 may include holes 52 as shown in FIG. 6. The holes 52 extend through the screen 50 from a side closer to the boundary portion to a side closer to the inflow port 24A. Multiple holes 52 (six, in FIG. 6) may be provided. As shown in FIGS. 5, 6, since the slits 51 or the holes 52 are provided in the screen 50, the flow rate of the engine coolant supplied to the first tubes 411 closer to the boundary portions than the screen 50 can be adjusted as required by changing the number or size of the slit 51 or the holes 52.

Figure 7:
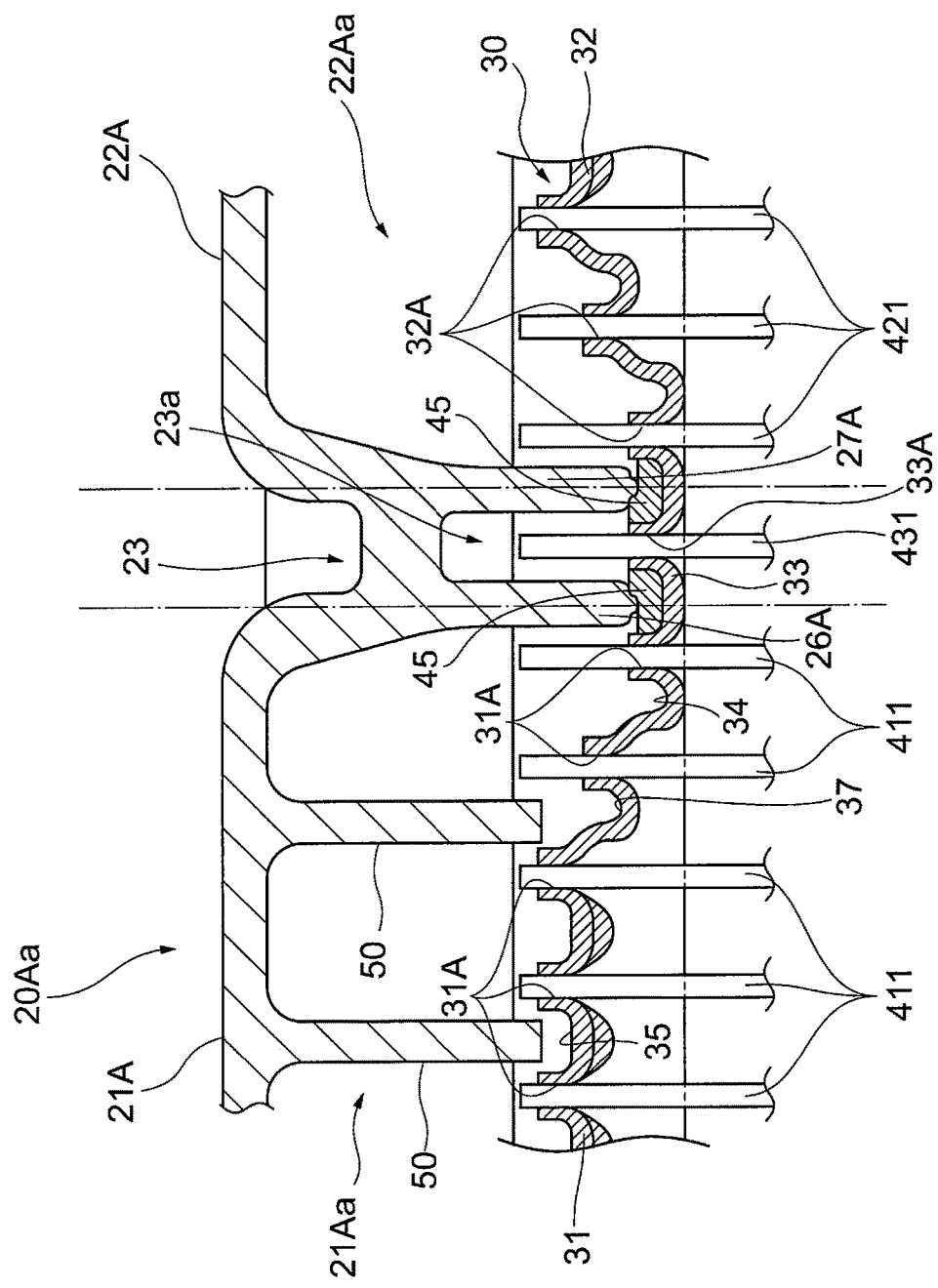
FIG. 7 is a cross-sectional diagram illustrating a modification of the first embodiment.

As shown in FIG. 7, multiple (two, in FIG. 7) screens 50 may be aligned in a flow direction of the engine coolant flowing from the inflow port 24A of the first tank chamber 21Ba to the boundary portion. According to this, the flow rate of the engine coolant can be reduced step by step.

In the above-described embodiment, the engine coolant that is the first fluid flows through the first heat exchanger HE1, which includes the first tank chambers 21Aa, 21Ba and the first tubes 411 connected to the first tank chambers 21Aa, 21Ba, and the coolant for the electric power system that is the second fluid flows through the second heat exchanger HE2, which includes the second tank chambers 22Aa, 22Ba and the second tubes 421 connected to the second tank chambers 22Aa, 22Ba. However, other fluids may be used as the first fluid and the second fluid flowing through the heat exchanger HE. For example, refrigerant, oil, supercharged air, or exhaust air may be used instead of coolant.

In the above-described embodiment, the first heat exchanger HE1 is a radiator for the engine coolant, and the second heat exchanger HE2 is a radiator for the coolant for the electric power system. However, the first heat exchanger HE1 and the second heat exchanger HE2 may be used in other ways. For example, the first heat exchanger HE1 and the second heat exchanger HE2 may be used as a condenser for refrigerant (or oil) of an air conditioner, or an intercooler for cooling supercharged air of a supercharger or exhaust gas.

Second Embodiment

A second embodiment will be described with reference to FIGS. 8 to 11. As shown in FIGS. 8 to 11, the second embodiment is different from the first embodiment in that the flow rate of the engine coolant supplied to the first tubes 411 close to the boundary portion (hereinafter, referred to as "flow rate limiting target tubes") is reduced by changing the shape of the first tubes 411 close to the boundary portion.

Figure 8:
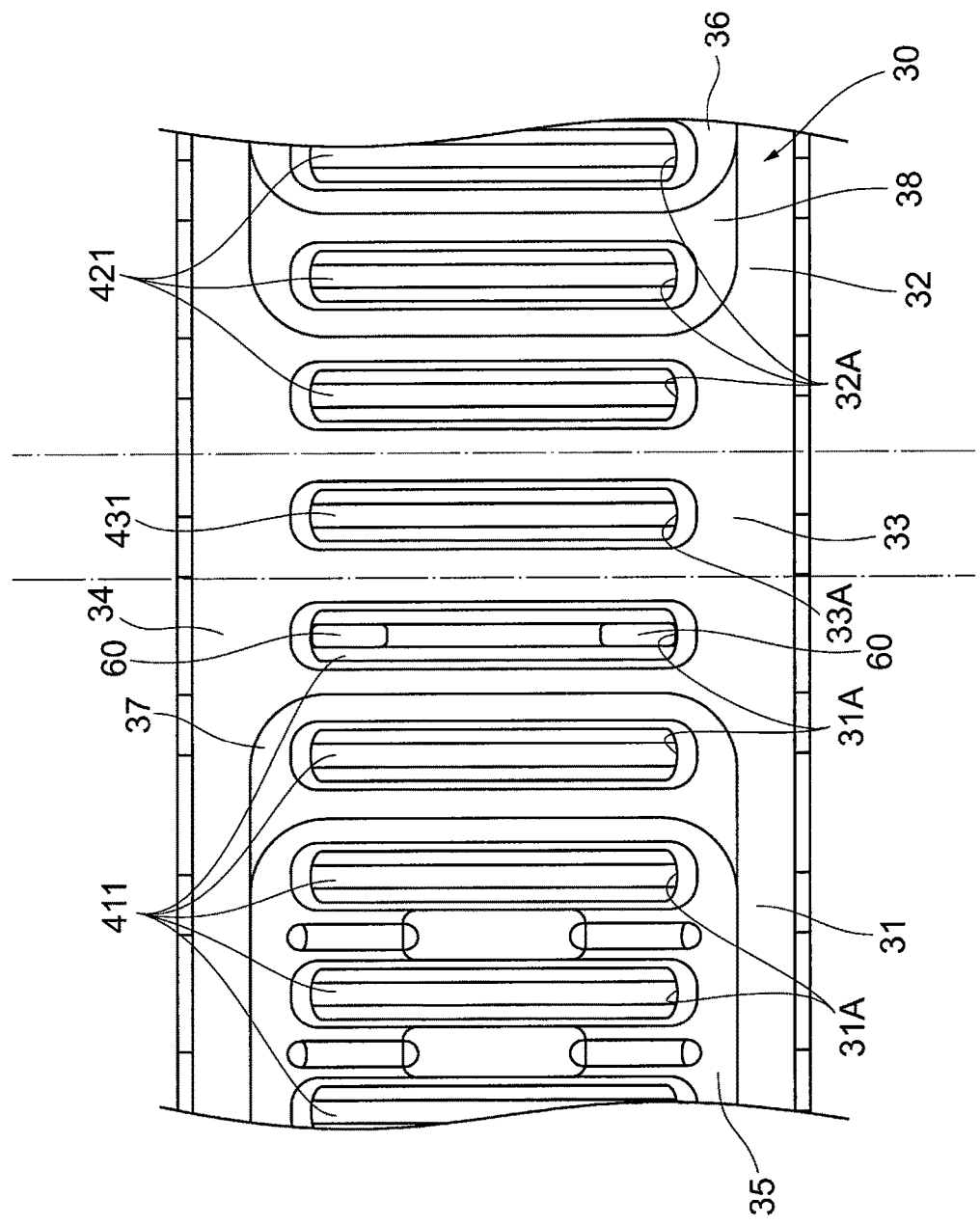
FIG. 8 is a plan view illustrating a heat exchanger according to a second embodiment of the present disclosure.

In FIG. 8, a specific example according to the second embodiment is illustrated. As shown in FIG. 8, a stiffener 60 is attached to an inflow port of the flow rate limiting target tube 411 located in the first tank chamber 21Aa. The stiffener 60 is a member fitted into a pipe for improving strength or limiting deformation of the pipe, generally. Since the stiffener 60 is attached to the inflow port of the flow rate limiting target tubes 411, an area of the inflow port can be decreased as shown in FIG. 8. Accordingly, the flow rate of the engine coolant supplied to the flow rate limiting target tubes 411 can be reduced.

Figure 9:
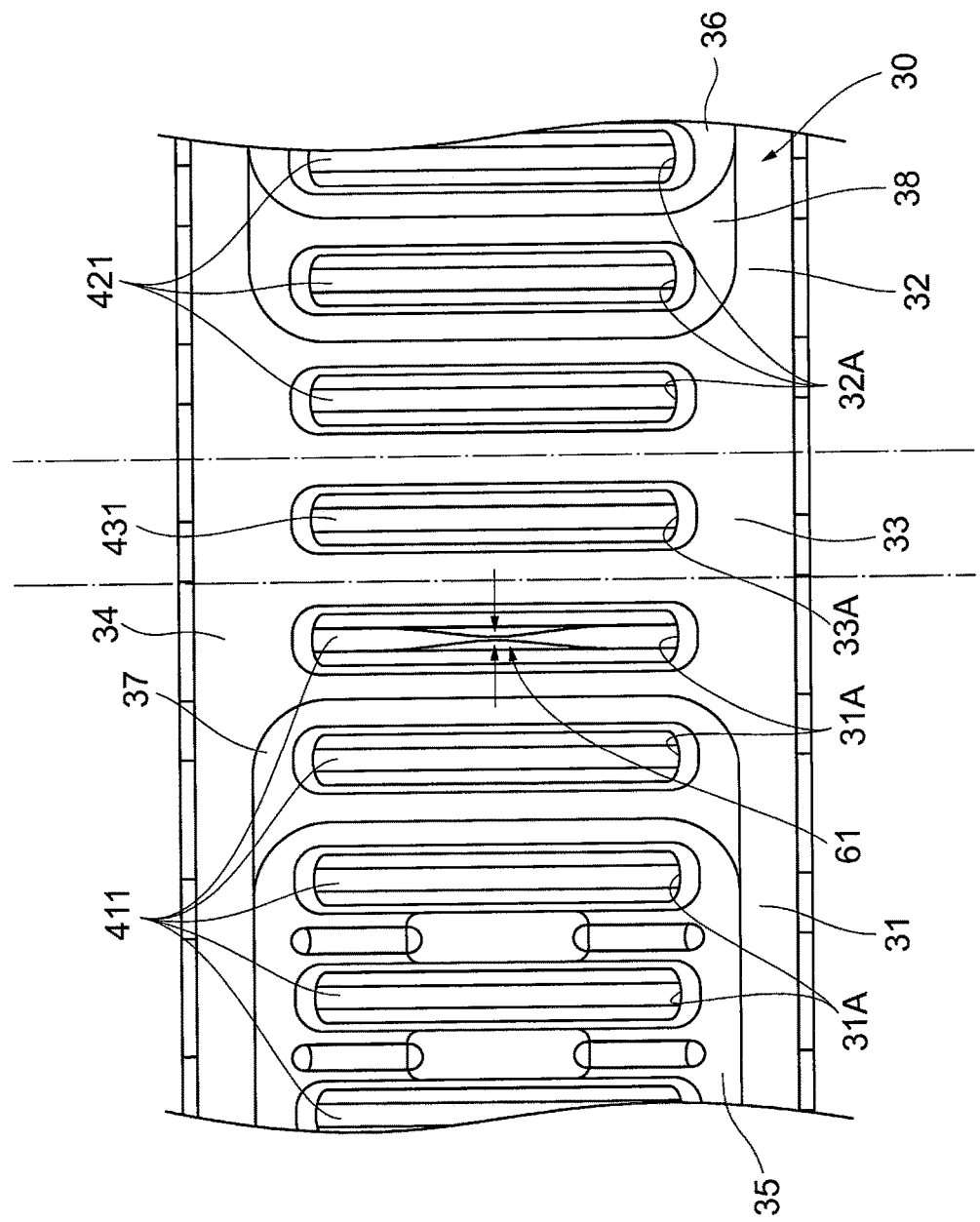
FIG. 9 is a plan view illustrating the heat exchanger according to the second embodiment.

Another example of the second embodiment is illustrated in FIG. 9. A narrowing portion 61 is provided, which decreases an area of a part of the inflow port of the first tubes 411 located in the first tank chamber 21Aa. The narrowing portion 61 is formed by pushing a pair of long sides facing to each other in a direction in which short sides extend, thereby a relative direction between a part of the long sides decreases. Since the narrowing portion 61 is formed in the inflow port, area of the inflow port of the flow rate limiting target tubes 411 is decreased. Accordingly, the flow rate of the engine coolant supplied to the flow rate limiting target tubes 411 can be reduced.

Figure 10:
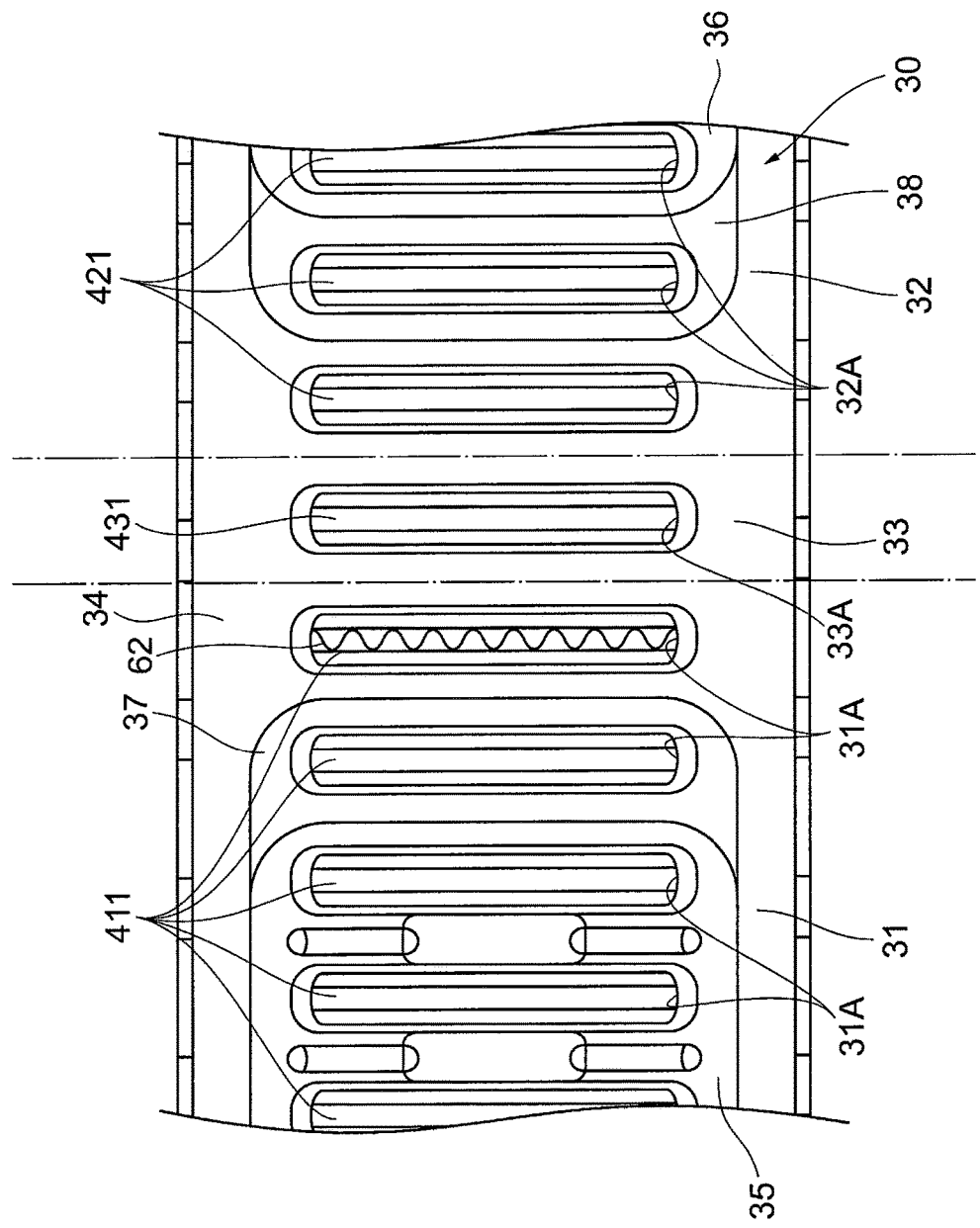
FIG. 10 is a plan view illustrating the heat exchanger according to the second embodiment.

Another example according to the second embodiment is illustrated in FIG. 10. As shown in FIG. 10, an inner fin 62 is provided in the inflow port of the flow rate limiting target tubes 411 located in the first tank chamber 21Aa. The inner fin extends in a direction in which the tubes extend (up-down direction of FIG. 1) or a direction perpendicular to the tube extending direction (up-down direction of FIG. 10) and is corrugated to have a wavy shape. The inner fin is provided in the flow passage in the first tube 411. Since the flow passage in the tube is divided by the inner fin 62, and resistance that the fluid receives increases, the flow rate of the engine coolant supplied to the flow rate limiting target tubes 411 can be decreased.

Figure 11:
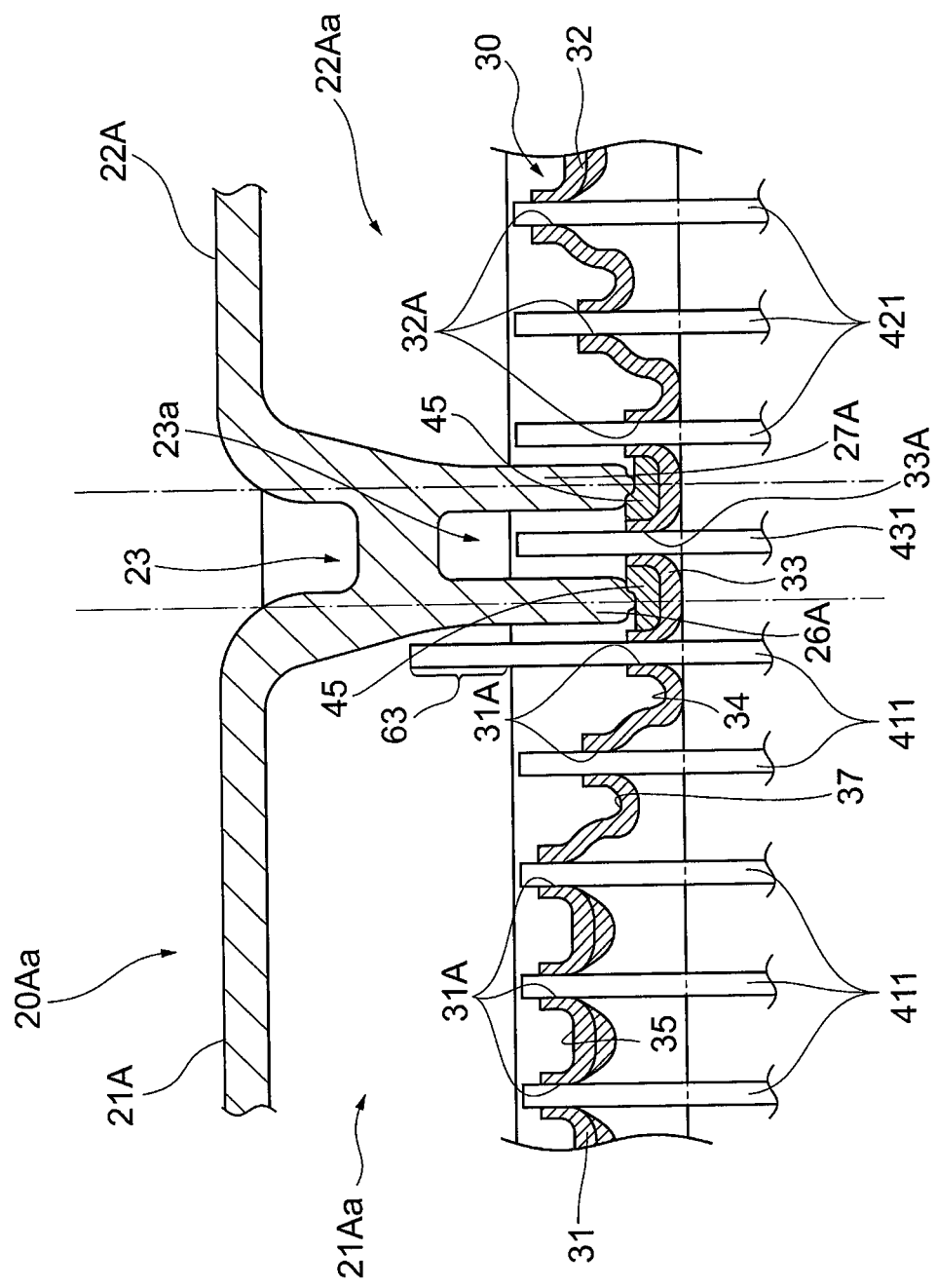
FIG. 11 is a cross-sectional diagram illustrating the heat exchanger according to the second embodiment.

Another example according to the second embodiment is illustrated in FIG. 11. As shown in FIG. 11, the flow rate limiting target tubes 411 includes a protruding portion 63. A length of a part of the flow rate limiting target tubes 411 protruding in the first tank chamber 21Aa is larger than the other tubes. Accordingly, since the inflow port of the flow rate limiting target tubes 411 are located in an upper part than the other tubes, the engine coolant is unlikely to reach the inflow port compared to the other tubes, and accordingly the flow rate of the engine coolant supplied to the flow rate limiting target tubes 411 can be decreased.

As described above, the stiffener 60, the narrowing portion 61, the inner fin 62, or the protruding portion 63 is provided in the first tank chamber 21Aa, and those function as the "flow rate limiting portion" which reduces the flow rate of the engine coolant supplied to the flow rate reduction target tubes 411 that includes at least one tube closest to the boundary portion defined by the partition wall 26A. Accordingly, the configuration of the second embodiment includes substantially the same features as the first embodiment, and the same effects as the first embodiment can be achieved by the second embodiment.

Third Embodiment

Figure 12:
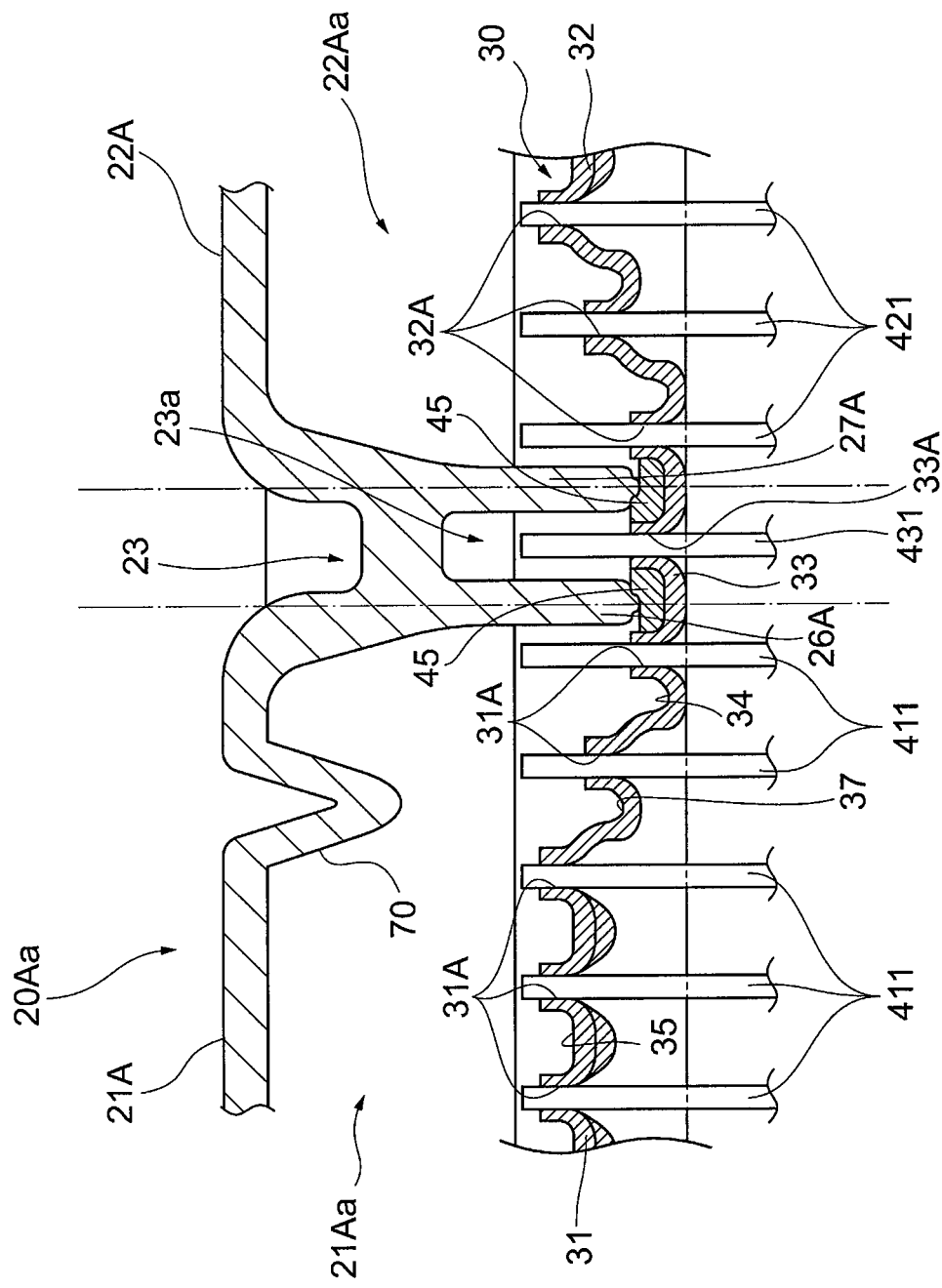
FIG. 12 is a cross-sectional diagram illustrating a heat exchanger according to a third embodiment of the present disclosure.
Figure 13:
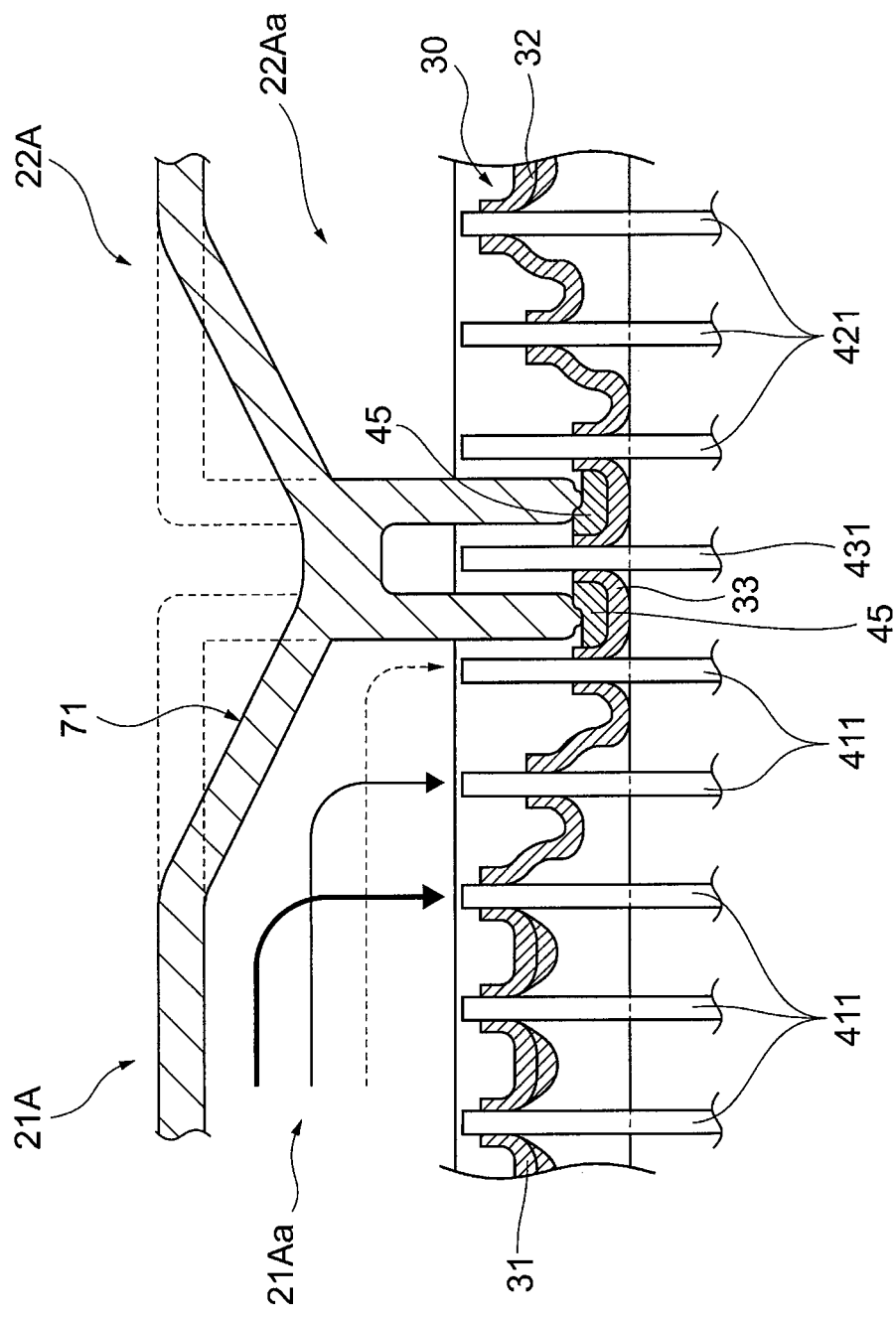
FIG. 13 is a cross-sectional diagram illustrating the heat exchanger according to the third embodiment.
Figure 14:
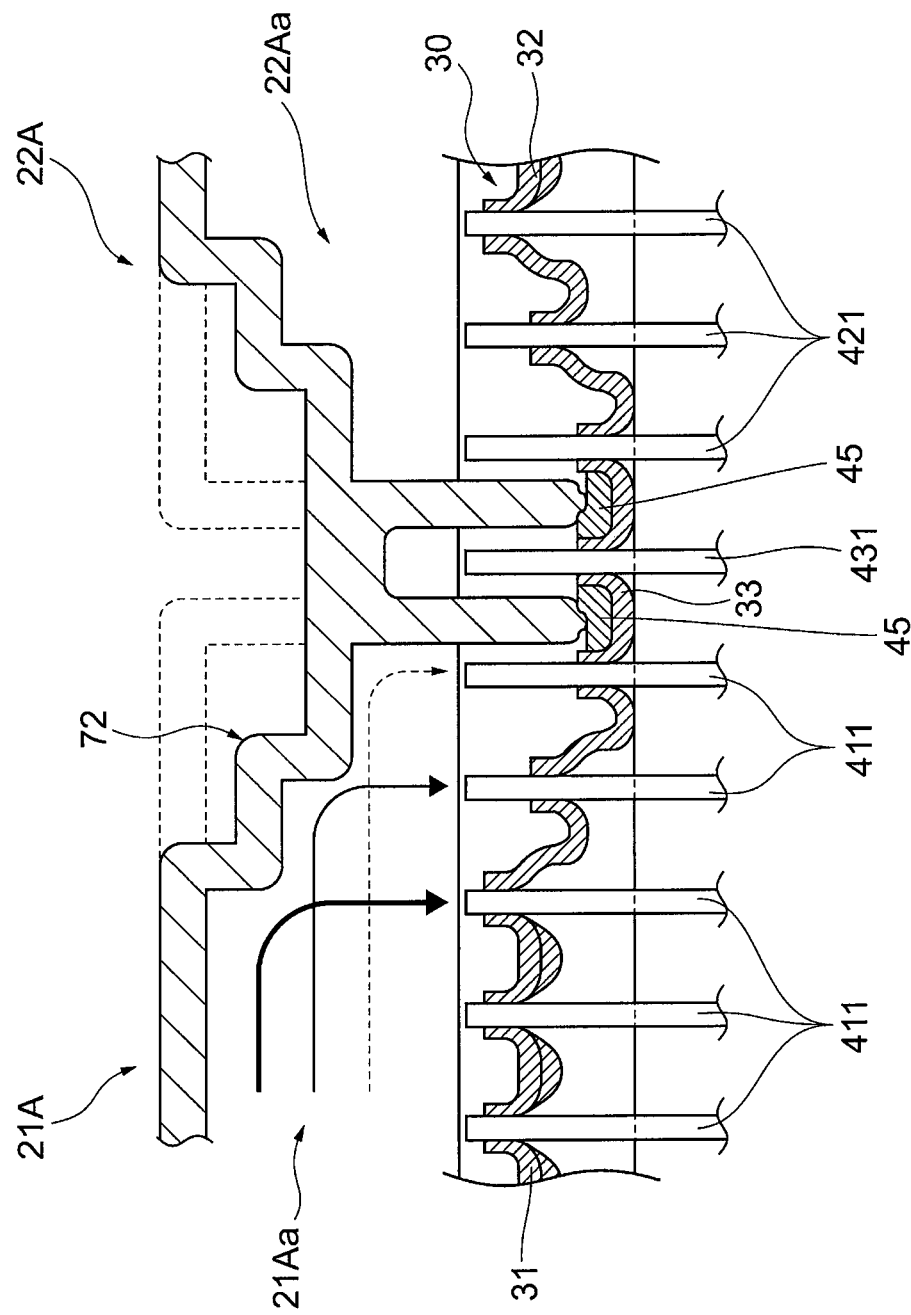
FIG. 14 is a cross-sectional diagram illustrating the heat exchanger according to the third embodiment.

A third embodiment will be described with reference to FIGS. 12 to 14. As shown in FIGS. 12 to 14, the third embodiment is different from the first and second embodiments in that a part of the member body 20Aa protrudes inward of the first tank chamber 21Aa, and thereby the flow rate of the engine coolant supplied to the flow rate reduction target tubes 411 is reduced.

A significant example of the third embodiment is illustrated in FIG. 12. As shown in FIG. 12, a screen wall 70 is provided in the first tank chamber 21Aa and adjacent to a side of the flow rate reduction target tubes 411 that faces away from the boundary portion. The screen wall 70 is formed by recessing a part of a wall of the member body 20Aa, for example. The function of the screen wall 70 is the same as the screen 50 of the first embodiment. Accordingly, since the flow passage in the first tank chamber 21Aa is narrowed by the screen wall 70, the coolant cannot easily flow to a part closer to the boundary portion than the screen wall 70, and the flow rate of the engine coolant supplied to the flow rate reduction target tubes 411 can be reduced.

Another example of the third embodiment is illustrated in FIG. 13. In this example, it is assumed that multiple flow rate reduction target tubes 411 are provided. As shown in FIG. 13, a wall surface portion 71 is formed by recessing the wall of the member body 20Aa inward of the first tank chamber 21Aa such that a distance between the wall and the inflow ports of the multiple flow rate reduction target tubes 411 decreases toward the boundary portion. The wall surface portion 70 is an inclined surface that gradually becomes closer to the core plate 30 toward the boundary portion, thereby a top part of the inner wall of the first tank chamber 21Aa becomes closer to the core plate 30. According to this configuration, the flow passage inside the first tank chamber 21Aa decreases toward the boundary portion, the flow rate of the engine coolant supplied to the flow rate reduction target tubes 411 can be gradually decreased toward the boundary portion.

FIG. 14 shows a modification of the configuration of FIG. 13. As shown in FIG. 14, the wall surface portion 72 may have a stair shape. According to this configuration also, the flow rate of the engine coolant supplied to the flow rate reduction target tubes 411 can be reduced toward the boundary portion.

In the third embodiment, the screen wall 70, the wall surface portion 71, or the wall surface portion 72 shown in FIGS. 12 to 14 is provided in the first tank chamber 21Aa and functions as the "flow rate limiting portion" that reduces the flow rate of the engine coolant supplied to the flow rate reduction target tubes 411 close to the partition wall 26A. Accordingly, the configuration of the third embodiment includes substantially the same features as the first embodiment, and the same effects as the first embodiment can be achieved by the third embodiment.

The embodiments of the present disclosure are described with reference to specific examples above. However, the present disclosure is not limited to the above specific examples. That is, those in which design modifications have been appropriately made by those skilled in the art to the above specific examples are also included in the scope of the present disclosure as long as they have the features of the present disclosure. For example, elements, arrangements, materials, conditions, shapes, sizes, and the like of the respective specific examples described above are not limited to those exemplified and can be appropriately changed. In addition, the elements included in the above-described embodiment can be combined as far as technically possible, and combinations thereof are also included in the scope of the present disclosure as long as the features of the present disclosure are included.

Although the present disclosure has been fully described in connection with the embodiments thereof, it is to be noted that various changes and modifications will become apparent to those skilled in the art. Moreover, other combinations and configurations, including more, less or only a single element, are also within the spirit and scope of the present disclosure.

What is claimed is:

1. A heat exchanger comprising:
a core portion that includes a plurality of tubes in which a fluid flows; and
a pair of header tanks that are located on opposite ends in the longitudinal direction of the plurality of tubes and communicate with the plurality of tubes, wherein
one of the pair of header tanks includes a first tank chamber and a second tank chamber, which are defined by
a core plate joined to the plurality of tubes,
a tank body, and
a partition wall joined to the tank body,
a first fluid flows through the first tank chamber and a first tube group of the plurality of tubes connected to the first tank chamber, and
a second fluid different in temperature range from the first fluid flows through the second tank chamber and a second tube group of the plurality of tubes connected to the second tank chamber,
the heat exchanger further comprises:
a flow rate limiting portion provided in at least one of the first tank chamber or the second tank chamber, wherein
the flow rate limiting portion is configured to reduce a flow rate of the first fluid or the second fluid supplied to at least first one tube of the plurality of tubes from a boundary portion provided by the partition wall,
the flow rate limiting portion includes a screen that is provided on an inner wall of the tank body and is next to a side of the flow-reduced at least first one tube that faces away from the boundary portion, and
the screen has a slit that extends from an end portion of the screen in a direction from the core plate toward the inner wall of the tank body.

2. The heat exchanger according to claim 1, wherein the core plate includes
a sealing surface that is close to the boundary portion and is connected to the flow-reduced at least first one tube,
a tube connection surface positioned inward of the sealing surface in the header tank and connected to other tubes of the plurality of tubes, and
a connection portion that connects the sealing surface and the tube connection surface, and
the screen is positioned to correspond to the connection portion.

3. The heat exchanger according to claim 1, wherein a plurality of the screens are provided in one of the first tank chamber or the second tank chamber.

4. A heat exchanger comprising:
a core portion that includes a plurality of tubes in which a fluid flows; and
a pair of header tanks that are located on opposite ends in the longitudinal direction of the plurality of tubes and communicate with the plurality of tubes, wherein
one of the pair of header tanks includes a first tank chamber and a second tank chamber, which are defined by
a core plate joined to the plurality of tubes,
a tank body, and
a partition wall joined to the tank body,
a first fluid flows through the first tank chamber and a first tube group of the plurality of tubes connected to the first tank chamber, and a second fluid different in temperature range from the first fluid flows through the second tank chamber and a second tube group of the plurality of tubes connected to the second tank chamber, the heat exchanger further comprises:

a flow rate limiting portion provided in at least one of the first tank chamber or the second tank chamber, wherein the flow rate limiting portion is configured to reduce a flow rate of the first fluid or the second fluid supplied to at least first one tube of the plurality of tubes from a boundary portion provided by the partition wall, the flow rate limiting portion includes a part of the tank body protruding into an inside of the first tank chamber or the second tank chamber so as to reduce the flow rate, and the flow rate limiting portion includes a screen wall that is a part of a wall of the tank body recessed inward in the first tank chamber or the second tank chamber, the flow rate limiting portion being next to a side of the flow-reduced at least first one tube that is faces away from the boundary portion.

5. A heat exchanger comprising:

a core portion that includes a plurality of tubes in which a fluid flows; and a pair of header tanks that are located on opposite ends in the longitudinal direction of the plurality of tubes and communicate with the plurality of tubes, wherein one of the pair of header tanks includes a first tank chamber and a second tank chamber, which are defined by a core plate joined to the plurality of tubes,
a tank body, and
a partition wall joined to the tank body, a first fluid flows through the first tank chamber and a first tube group of the plurality of tubes connected to the first tank chamber, and a second fluid different in temperature range from the first fluid flows through the second tank chamber and a second tube group of the plurality of tubes connected to the second tank chamber, the heat exchanger further comprises:

a flow rate limiting portion provided in at least one of the first tank chamber or the second tank chamber, wherein the flow rate limiting portion is configured to reduce a flow rate of the first fluid or the second fluid supplied to at least first one tube of the plurality of tubes from a boundary portion provided by the partition wall, the flow rate limiting portion is configured to reduce a flow rate of the first fluid or the second fluid supplied to a plurality of tubes closest to the boundary portion provided by the partition wall, and the flow rate limiting portion includes a wall surface portion that is recessed inward from a wall of the tank body in the first tank chamber or the second tank chamber such that a distance between inflow ports of the plurality of flow-reduced tubes and the wall of the tank body facing to the inflow ports decreases toward the boundary portion.

6. The heat exchanger according to claim 1, wherein the first fluid and the second fluid include cooling water, refrigerant, oil, and supercharged air.

* * * * *